Patented Aug. 26, 1930

1,774,322

UNITED STATES PATENT OFFICE

BENJAMIN S. GARVEY, OF AKRON, OHIO, ASSIGNOR TO THE B. F. GOODRICH COMPANY, OF NEW YORK, N. Y., A CORPORATION OF NEW YORK

VULCANIZATION OF RUBBER

No Drawing.   Application filed April 19, 1929.   Serial No. 356,612.

This invention relates to the art of vulcanizing rubber, and especially to the vulcanization of rubber in a very short time or at a low temperature.

Rubber technologists have striven for years to reduce both the time and the temperature of vulcanization, both for the purpose of producing a better quality of rubber, and in order to increase the output of their vulcanizing equipment. With this end in view numerous vulcanization accelerators have been developed, some of them being so active that vulcanization is complete in a few days at room temperatures or in a few minutes at temperatures above the boiling point of water. However, the accelerators which have heretofore been proposed, if sufficiently active to enable a substantial reduction in vulcanization time or temperature, are so active that the heat developed in the mixing or forming of the rubber composition is sufficient to institute vulcanization, the composition being said to "scorch".

The object of this invention is to provide a method for vulcanizing rubber at a comparatively low temperature, or in a short time, without danger of "scorching" or partial vulcanization during the mixing or other operations preliminary to vulcanization. Another object is to provide rubber compositions which may be vulcanized by such a method.

This invention, in brief, comprises admixing rubber with sulphur and two other substances, neither of which is an active accelerator of vulcanization at low temperatures, but one of which, although stable at room temperatures, decomposes rapidly at vulcanization temperatures with the liberation of non-accelerating products which react with the other substance to form a very active accelerator of vulcanization. In other words, rubber containing sufficient sulphur for complete vulcanization is mixed with two substances A and D, both of which are stable and substantially inactive at room temperatures. When the mixture is heated, A decomposes rapidly, forming B and C, neither of which is an accelerator. C reacts with D to form a very active accelerator which causes the reaction of the sulphur with the rubber.

It is known in the art that certain mixtures of accelerators are more active than might be expected from the activity of the accelerators when employed alone. However, in the process of this invention, one of the substances added in non-accelerating itself and decomposes during vulcanization, with the formation of non-accelerating products. It is only after the reaction of these products with the second substance that a truly active accelerator is formed.

It is important in the practice of this invention that the decomposable substance (called A in the example above) be sufficiently stable at normal temperatures that practically no decomposition takes place, and therefore none of the active accelerator be formed. On the other hand, the decomposition at vulcanizing temperatures should be rapid and fairly complete. The metallic trithiocarbonates and particularly the alkaline earth trithiocarbonates have been found to fulfill these requirements adequately. They are stable crystalline compounds at room temperatures, but at elevated temperatures such as are employed for vulcanization they decompose rapidly and completely according to the following equation, Me representing, for example, a bivalent metal:

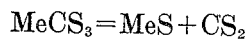

$$MeCS_3 = MeS + CS_2$$

The carbon disulphide thus liberated reacts readily with secondary aliphatic amines such as diethylamine or piperidine to form ultra-accelerators, although neither the thiocarbonate nor its decomposition products are accelerators.

Barium trithiocarbonate has been found to be very satisfactory, because of its low cost, stability at normal temperature and great activity at temperatures above the boiling point of water. Compositions containing barium trithiocarbonate and a non-volatile secondary aliphatic amine, in addition to the customary rubber, sulphur and zinc oxide, vulcanize very rapidly at high temperatures but are not sensitive to temperatures substantially below the boiling point of water.

The secondary aliphatic amines in general react rapidly with carbon disulphide, forming very active accelerators, but many of the aliphatic amines, and especially those of low molecular weight which are the most active, are quite volatile and therefore difficult to incorporate and retain in rubber in exact proportions. Certain of the derivatives, however, while they possess substantially the same chemical reactivity as the amines themselves, are practically non-volatile and are readily handled in the rubber factory. Such derivatives include addition products such as salts with weak acids or formaldehyde addition products. For example, piperidine-formaldehyde has proven more useful in connection with the thiocarbonates than piperidine alone, its reactivity being substantially the same, while its volatility is much lower than that of piperidine, which evaporates rapidly from rubber mixtures into which it is incorporated. Other secondary aliphatic amines or amine derivatives which have been tested and which have given satisfactory results include diethylamine, dibutylamine, dibenzylamine, dicyclohexylamine, trimethyl-piperidine, diethylamine-hydroquinone, diethylamine-oxalate, diethylamine-acid oxalate, piperidine-acetate, etc.

As an illustration of the comparative accelerating properties of the thiocarbonates, the secondary amines, and mixtures thereof, at vulcanizing temperatures, rubber compositions were prepared containing rubber 100 parts by weight, zinc oxide 10 parts, and sulphur 4 parts. To one of the compositions was added 3 parts of barium trithiocarbonate, to another 0.6 parts of piperidine-formaldehyde, and to the third 3.0 parts of barium trithiocarbonate and 0.6 parts of piperidine-formaldehyde. The three compositions were vulcanized in a press and the tensile strength of the vulcanized rubber was measured to determine the degree of vulcanization. T in the following table indicates ultimate tensile strength in pounds per square inch, while E indicates ultimate elongation in per cent of the original length.

| Time of vulcanization | Accelerator | | | | | |
|---|---|---|---|---|---|---|
| | Barium trithiocarbonate | | Piperidine-formaldehyde | | Barium trithiocarbonate +piperidine-formaldehyde | |
| | T | E | T | E | T | E |
| 5 min. at 260° F | 43 | 1510 | 23 | 1190 | 2147 | 880 |
| 10 min. at 260° F | 48 | 1165 | 255 | 1140 | 3809 | 790 |
| 15 min. at 260° F | 46 | 1090 | 42 | 980 | 4245 | 703 |
| 30 min. at 260° F | 67 | 1035 | 1636 | 960 | 4243 | 645 |

The samples containing only barium trithiocarbonate were so badly under-cured that they were almost too weak to test. The samples containing only piperidine-formaldehyde were barely beginning to vulcanize after 30 minute at 260° F., while the samples containing both barium trithiocarbonate and piperidine-formaldehyde were completely vulcanized after only 15 minutes at the same temperature. However, this composition, in spite of its extremely rapid curing characteristics, is not sensitive to temperatures normally encountered in mixing, milling, calendering, etc. and may be handled without any special precautions. At room temperatures it may be stored for months without "setting up" or air-curing.

The superiority of the mixture of barium trithiocarbonate and a secondary aliphatic amine over the dithiocarbamate derived from the same amine is illustrated by the following tests. Two rubber compositions were prepared containing rubber 100 parts by weight, zinc oxide 10 parts and sulphur 4 parts. In addition one contained 0.6 parts of the piperidine salt of pentamethylene-dithiocarbamic acid prepared by reacting carbon disulphide with piperidine, while the other contained 6 parts of barium trithiocarbonate and 0.6 parts of piperidine-formaldehyde. The comparative rates of vulcanization of the two compositions were determined at several different temperatures.

| Time of vulcanization | Accelerator | | | |
|---|---|---|---|---|
| | Piperidine salt of pentamethylene dithiocarbamic acid | | Barium trithiocarbonate+piperidine-formaldehyde | |
| | T | E | T | E |
| 15 min. at 220° F | 3376 | 850 | no cure | |
| 30 min. at 220° F | 3975 | 795 | 200 | 995 |
| 45 min. at 220° F | 4572 | 715 | 2228 | 855 |
| 60 min. at 220° F | 4824 | 690 | 3530 | 725 |
| 15 min. at 240° F | 4052 | 760 | 440 | 895 |
| 30 min. at 240° F | 3856 | 660 | 3509 | 725 |
| 45 min. at 240° F | 4500 | 670 | 4116 | 710 |
| 60 min. at 240° F | 4235 | 640 | 4196 | 705 |
| 10 min. at 260° F | 4233 | 735 | 3809 | 790 |
| 20 min. at 260° F | 4107 | 745 | 4749 | 675 |
| 30 min. at 260° F | 4000 | 730 | 4243 | 645 |

It is evident from the above table that the dithiocarbamate is an extremely rapid accelerator at low temperatures such as 220°, but that the composition containing the barium trithiocarbonate and piperidine-formaldehyde vulcanizes only very slowly at this temperature. However, as the temperature is raised to 240° and 260°, the latter vulcanizes more and more rapidly until it approaches the rate of vulcanization of the first composition.

In some cases it may be found desirable to employ a mixture of different aliphatic amines or even a mixture of a secondary aliphatic amine with a primary or secondary aromatic amine or aromatic amine derivative. For example, p-amino-dimethylaniline, diphenylguanidine, or butyraldehyde-aniline may be added to the hereinabove described compositions, for the purpose of increasing the rate of vulcanization, increasing the resistance to deterioration upon aging, or for any other purpose.

Although calcium or strontium trithiocarbonates may be substituted for the barium trithiocarbonate, the latter has proven more stable at low temperature, and very active at high temperatures and is therefore preferred.

It is evident that the method of this invention is extremely useful in the manufacture of rubber goods which are to be cured in a very short time, since danger of scorching is practically eliminated. The method may also be applied to the manufacture of quick-curing cements which will not "liver" or gel before they can be used.

Obviously, the practice of this invention is not limited to the specific compositions hereinabove described, since fillers, pigments, softeners, antioxidants, or other conditioning agents may be admixed with the rubber in conjunction with the vulcanizing agents to produce rubber compositions adapted for use in tire friction stock, rubber heels, rubber boots, belting, golf-ball covers, hose, etc. It is therefore to be understood that the term "rubber" is employed in the appended claims in a generic sense to include caoutchouc, whether natural or synthetic, balata, gutta-percha, rubber isomers, and like products, whether or not admixed with fillers, pigments, softeners, or other conditioning agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of vulcanizing rubber which comprises incorporating into rubber a vulcanizing agent, a metallic trithiocarbonate, and a substance which reacts with carbon disulphide to form a rapid accelerator, and vulcanizing the mixture.

2. The method of vulcanizing rubber which comprises incorporating into rubber a vulcanizing agent, an alkaline earth trithiocarbonate, and a substance which reacts with carbon disulphide to form a rapid accelerator, and vulcanizing the mixture.

3. The method of vulcanizing rubber which comprises incorporating into rubber a vulcanizing agent, barium trithiocarbonate, and a substance which reacts with carbon disulphide to form a rapid accelerator, and vulcanizing the mixture.

4. The method of vulcanizing rubber which comprises incorporating into rubber a vulcanizing agent, barium trithiocarbonate, and a secondary aliphatic amine, and vulcanizing the mixture.

5. The method of vulcanizing rubber which comprises incorporating into rubber a vulcanizing agent, a metallic oxide, barium trithiocarbonate, and a secondary aliphatic amine, and vulcanizing the mixture.

6. The method of vulcanizing rubber which comprises admixing rubber, sulphur, zinc oxide, barium trithiocarbonate, and piperidine-formaldehyde and vulcanizing the mixture.

7. A vulcanizable rubber composition comprising rubber, a vulcanizing agent, a metallic trithiocarbonate, and a substance which reacts with carbon disulphide to form a rapid accelerator.

8. A vulcanizable rubber composition comprising rubber, a vulcanizing agent, an alkaline earth trithiocarbonate, and a secondary aliphatic amine.

9. A vulcanizable rubber composition comprising ruber, a vulcanizing agent, barium trithiocarbonate, and a secondary aliphatic amine.

10. A vulcanizable rubber composition comprising rubber, a vulcanizing agent, zinc oxide, barium trithiocarbonate, and a secondary aliphatic amine.

11. A vulcanizable rubber composition comprising rubber, sulphur, zinc oxide, barium trithiocarbonate, and piperidine-formaldehyde.

12. A rubber product resulting from the vulcanization of a composition comprising rubber, a vulcanizing agent, a metallic trithiocarbonate and a secondary aliphatic amine.

13. A rubber product resulting from the vulcanization of a composition comprising rubber, sulphur, zinc oxide, barium trithiocarbonate, and piperidine-formaldehyde.

14. The method of vulcanizing rubber which comprises incorporating into rubber a vulcanizing agent, an alkaline earth trithiocarbonate, and a non-volatile derivative of a secondary aliphatic amine, and vulcnizing the mixture.

15. The method of vulcanizing rubber which comprises incorporating into rubber a vulcanizing agent, barium trithiocarbonate, and a non-volatile, readily reactive derivative of a volatile secondary amine, and vulcanizing the mixture.

16. A vulcanizable rubber composition comprising rubber, sulphur, an alkaline earth trithiocarbonate, and a non-volatile derivative of a secondary aliphatic amine.

17. A vulcanizable rubber composition comprising rubber, sulphur, zinc oxide, barium trithiocarbonate, and a non-volatile, readily reactive derivative of a volatile secondary amine.

In witness whereof I have hereunto set my hand this 13th day of April, 1929.

BENJAMIN S. GARVEY.